(12) United States Patent
Yoon et al.

(10) Patent No.: US 7,940,737 B2
(45) Date of Patent: May 10, 2011

(54) METHOD AND APPARATUS FOR MULTIPLEXING MULTIPLE REVERSE FEEDBACK CHANNELS IN MULTI-CARRIER WIRELESS NETWORKS

(75) Inventors: Young C. Yoon, San Diego, CA (US); Suk Woo Lee, San Diego, CA (US); Li-Hsiang Sun, San Diego, CA (US)

(73) Assignee: LG Electronics Inc., Seoul (KR)

( * ) Notice: Subject to any disclaimer, the term of this patent is extended or adjusted under 35 U.S.C. 154(b) by 905 days.

(21) Appl. No.: 11/534,193

(22) Filed: Sep. 21, 2006

(65) Prior Publication Data

US 2007/0201406 A1 Aug. 30, 2007

Related U.S. Application Data

(60) Provisional application No. 60/719,414, filed on Sep. 21, 2005, provisional application No. 60/727,742, filed on Oct. 17, 2005.

(51) Int. Cl.
H04W 4/00 (2009.01)
H04B 7/216 (2006.01)

(52) U.S. Cl. .................. 370/342; 370/329; 370/335

(58) Field of Classification Search ............... 455/509; 370/329, 335, 342
See application file for complete search history.

(56) References Cited

U.S. PATENT DOCUMENTS

| 2004/0266466 A1 | 12/2004 | Kim et al. | |
| 2006/0229091 A1* | 10/2006 | Rezaiifar et al. | 455/509 |
| 2008/0159248 A1* | 7/2008 | Li | 370/342 |

FOREIGN PATENT DOCUMENTS

| EP | 1065897 | 1/2001 |
| EP | 1353480 | 10/2003 |
| EP | 1533966 | 5/2005 |
| JP | 2003-522446 | 7/2003 |
| JP | 2004-040787 | 2/2004 |
| JP | 2004-531100 | 10/2004 |
| JP | 2005-512473 | 4/2005 |
| JP | 2008-0536407 | 9/2008 |
| JP | 2008-536408 | 9/2008 |
| JP | 2009-0508368 | 2/2009 |
| JP | 2009-509392 | 3/2009 |
| WO | 9824258 | 6/1998 |
| WO | WO 01/15481 | 3/2001 |
| WO | 0247416 | 6/2002 |
| WO | 03049005 | 6/2003 |
| WO | 2004/059886 | 7/2004 |

(Continued)

OTHER PUBLICATIONS

Sprint PCS User Guide for Sony / QUALCOMM QCP-2700SPR (Jul. 1997) pp. 1-11.*

(Continued)

*Primary Examiner* — Nghi H Ly
*Assistant Examiner* — Larry Sternbane
(74) *Attorney, Agent, or Firm* — Lee, Hong, Degerman, Kang & Waimey

(57) ABSTRACT

A method and apparatus is provided for multiplexing multiple Reverse feedback Channels in integrated multi-carrier systems in multi-carrier wireless networks. Assignment of a MAC Index for Reverse Link feedback channels to any Forward Link carrier using the Traffic Channel Assignment (TCA) message is facilitated.

9 Claims, 18 Drawing Sheets

FOREIGN PATENT DOCUMENTS

| WO | 2005050852 | 6/2005 |
|---|---|---|
| WO | WO 2006/110874 | 10/2006 |

OTHER PUBLICATIONS

Attar, R.: "cama2000 Evolution Technical Summary", 3GPP2 Air Interface Evolution Technical Expert Meeting, C00AIE-20050310-027R1, Mar. 10, 2005.

Attar, R et al.: "Multi-carrier DO Asymmetric Mode", 3GPP2 TSG-C, C30-20050829-027R1, Aug. 29, 2005.

Pi, Z. et al.: "Reverse Link ACK Channel Design for NxDO", 3GPP2 TSG-C, C30-20050816-014, Aug. 16, 2005.

R. Attar, "cdma2000 Evolution Technical Summary," 3GPP2 Air Interface Evolution Technical Expert Meeting, C00AIE-20050310-027R1, Mar. 2005.

R. Attar et al., "Multi-carrier DO Asymmetric Mode," 3GPP2 Meeting, C30-20050829-27R1, Aug. 2005.

Z. Pi et al., "Reverse Link ACK Channel Design for NxDO," 3GPP2 C30-20050816-014, Aug. 2005.

B. Sarikaya, "Packet Mode in Wireless Networks: Overview of Transition to Third Generation," IEEE Communications Magazine, pp. 164-172, Sep. 2000, XP-011091357.

* cited by examiner

CDMA SPREADING AND DESPREADING

CDMA SPREADING AND DESPREADING USING MULTIPLE SPREADING SEQUENCES

CDMA REVERSE POWER CONTROL

CDMA 2000 INITIALIZATION STATE

FIG. 7
COMPARISON OF CDMA2000 FOR 1x AND 1xEV-DO
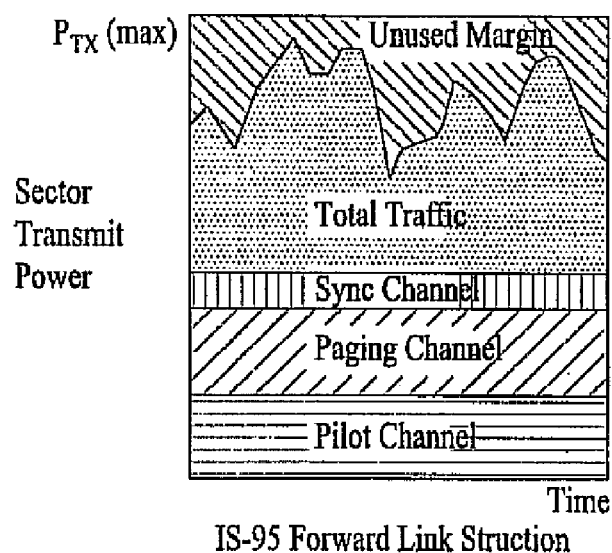
IS-95 Forward Link Struction
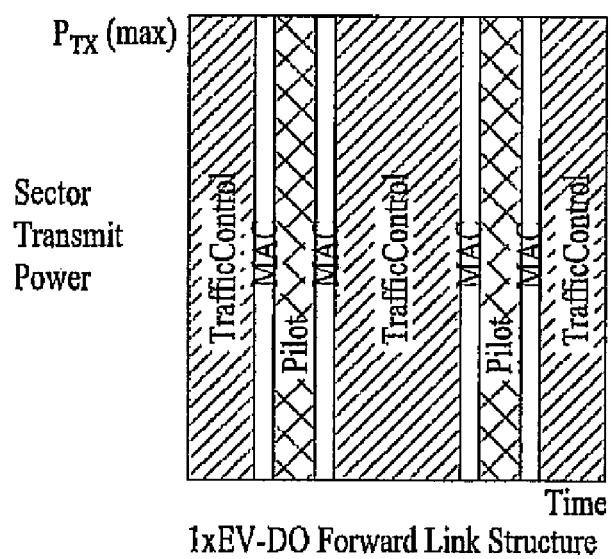
1xEV-DO Forward Link Structure 1xEV-DO NETWORK ARCHITECTURE 1xEV-DO DEFAULT PROTOCOL 1xEV-DO NON-DEFAULT PROTOCOL 1xEV-DO SESSION ESTABLISHMENT 1xEV-DO CONNECTION LAYER PROTOCOLS 1xEV-DO ACK/NAK OPERATION 1xEV-DO ACK CHANNEL IN REVERSE LINK

FIG. 15A

| Field | Length(bits) |
|---|---|
| MessageID | 8 |
| MessageSequence | 8 |
| DSCChannelGainBase | 5 |
| FrameOffset | 4 |
| NumSectors | 5 |
| NumSubActiveSets | 4 |
| AssignedChannelIncluded | 1 |
| SchedulerTagIncluded | 1 |
| FeedbackMultiplexingEnabled | 1 |

| Field | Length(bits) |
|---|---|
| RAChannelGain | 2 |
| PilotPN | 9 |
| DRCCover | 3 |
| SofterHandoff | 1 |

| Field | Length(bits) |
|---|---|
| NumFwdChannelsThisSubActiveSet | 4 |

NumFwdChannelsThisSubActiveSet occurrences of the following field:
{1

| AssignedChannel | 0 or 24 |
|---|---|

}1

| Field | Length(bits) |
|---|---|
| FeedbackEnabled | 1 |
| FeedbackMultiplexingIndex | 0 or 9 |
| FeedbackReverseChannelIndex | 0 or 4 |
| SubActiveSetCarriesControlChannel | 1 |
| ThisSubActiveSetNotReportable | 1 |
| DSCForThis SubActiveSetEnabled | 0 or 1 |
| Next3FieldsSameAsBefore | 0 or 1 |
| DRCLength | 0 or 2 |
| DRCChannelGainBase | 0 or 6 |
| ACKChannelGain | 0 or 6 |
| NumReverseChannelsIncluded | 1 |
| NumReverseChannels | 0 or 4 |

NumReverseChannels occurrences of the following record:
{1

| ReverseChannelConfiguration | 0 or 2 |
|---|---|
| ReverseBandClass | 0 or 5 |
| ReverseChannelNumber | 0 or 11 |
| ReverseChannelDroppingRank | 0 or 3 |

}1

NumSectors occurrences of the following record:
{1

| PilotInThisSectorIncluded | 1 |
|---|---|
| ForwardChannelIndexThisPilot | 0 or 4 |
| PilotGroupID | 0 or 3 |
| NumUniqueForwardTrafficMACIndices | 0 or 3 |
| SchedulerTag | 0 or 7 |
| AuxDRCCoverIncluded | 0 or 1 |
| AuxDRCCover | 0 or 3 |
| ForwardTrafficMACIndexPerInterlaceEnabled | 0 or 1 |

NumUniqueForwardTrafficMACIndices(if included)or
zero occurrences of the following record:
{2

| ForwardTrafficMACIndex | 0 or 10 |
|---|---|
| AssignedInterlaces | 0 or 4 |

}2

Num ReverseChannels occurrences of the following record:
{2

| ReverseLinkMACIndex | 0 or 9 |
|---|---|
| RABMACIndex | 0 or 7 |

FIG. 15D

| DSC | 3 |
|---|---|
| Reserved | Variable |

MOBILE STATION/ACCESS TERMINAL

METHOD AND APPARATUS FOR MULTIPLEXING MULTIPLE REVERSE FEEDBACK CHANNELS IN MULTI-CARRIER WIRELESS NETWORKS

CROSS-REFERENCE TO RELATED APPLICATIONS

This application claims the benefit of U.S. Provisional Application Ser. Nos. 60/719,414 filed on Sep. 21, 2005, and 60/727,742, filed on Oct. 17, 2005, the contents of which are hereby incorporated by reference herein in their entirety.

FIELD OF THE INVENTION

This invention is related to integrated multi-carrier systems and, in particular, to multiplexing multiple reverse link feedback channels on the forward link such as Reverse Power Control, Data Rate Control Lock (DRCLock) and ARQ Channels in multi-carrier wireless networks. The Reverse Power Control Channels carry power control commands over the forward link to control the transmit power of mobile terminals. The DRCLock channel feedbacks to the transmitter that the receiver has "locked" on to the transmitted DRC channel. The ARQ channels feedback an Acknowledgement (ACK) or Negative ACK (NACK) indicating whether the receiver has successfully decoded a received packet.

DESCRIPTION OF THE RELATED ART

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

Referring to FIG. 1, a wireless communication network architectures is illustrated. A subscriber uses a mobile station (MS) 2 to access network services. The MS 2 may be a portable communications unit, such as a hand-held cellular phone, a communication unit installed in a vehicle, or a fixed-location communications unit.

The electromagnetic waves for the MS 2 are transmitted by the Base Transceiver System (BTS) 3 also known as node B. The BTS 3 consists of radio devices such as antennas and equipment for transmitting and receiving radio waves. The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one of more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 10, 11 is an IS-41 standard interface 18.

The Packet data Serving Node (PDSN) 12 portion of the PSCN 8 provides routing for packet data traffic to and from MS 2. The PDSN 12 establishes, maintains, and terminates link layer sessions to the MS 2's 2 and may interface with one of more BS 6 and one of more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the AAA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Input data is combined with a fast spreading sequence and transmitted as a spread data stream. A receiver uses the same spreading sequence to extract the original data. FIG. 2A illustrates the spreading and de-spreading process. As illustrated in FIG. 2B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in read only memory (ROM).

A short PN code is another type of spreading sequence. A short PN code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN code is generated in a 42-bit register and is more than 40 days long, or about $4 \times 10^{13}$ chips long. Due to its length, a long PN code cannot be stored in ROM in a terminal and, therefore, is generated chip-by-chip.

Each MS 2 codes its signal with the PN long code and a unique offset, or Public long code Mask, computed using the long PN code ESN of 32-bits and 10 bits set by the system. The Public long code Mask produces a unique shift. Private long code Masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time. A forward channel is identified by its CDMA RF carrier frequency, the unique short code PN Offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN Offset of the individual MS 2. Reverse channels include traffic channels and access channels.

Individual users use traffic channels during actual calls to transmit traffic to the BTS 3. A reverse traffic channel is basically a user-specific Public or Private long code Mask and there are as many reverse traffic channels as there are CDMA terminals.

An MS 2 not yet involved in a call uses access channels to transmit registration requests, call setup requests, page responses, order responses and other signaling information. An access channel is basically a Public long code Offset unique to a BTS 3 sector. Access channels are paired with paging channels, with each paging channel having up to 32 access channels.

CDMA communication provides many advantages. Some of the advantages are variable rate vocoding and multiplexing, forward power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Reverse power control uses three methods in tandem to equalize all terminal signal levels at the BTS 3. Reverse open loop power control is characterized by the MS 2 adjusting power up or down based on a received BTS 3 signal (AGC). Reverse closed loop power control is characterized by the BTS 3 adjusting power up or down by 1 db at a rate of 800 times per second. Reverse outer loop power control is characterized by the BSC 4 adjusting a BTS 3 set point when the BSC has forward error correction (FER) trouble hearing the MS 2. FIG. 3 illustrates the three reverse power control methods.

The actual RF power output of the MS 2 transmitter (TXPO), including the combined effects of open loop power control from receiver AGC and closed loop power control by the BTS 3, cannot exceed the maximum power of the MS, which is typically +23 dbm. Reverse power control is performed according to the equation "TXPO=−(RX$_{dbm}$)−C+TXGA," where "TXGA" is the sum of all closed loop power control commands from the BTS 3 since the beginning of a call and "C" is +73 for 800 MHZ systems and +76 for 1900 MHz systems.

Using a RAKE receiver allows a MS 2 to use the combined outputs of the three traffic correlators, or "RAKE fingers," every frame. Each RAKE finger can independently recover a particular PN Offset and Walsh code. The fingers may be targeted on delayed multipath reflections of different BTS's 3, with a searcher continuously checking pilot signals.

The MS 2 drives soft Handoff. The MS 2 continuously checks available pilot signals and reports to the BTS 3 regarding the pilot signals it currently sees. The BTS 3 assigns up to a maximum of six sectors and the MS 2 assigns its fingers accordingly. All messages are sent by dim-and-burst without muting. Each end of the communication link chooses the best configuration on a frame-by-frame basis, with handoff transparent to users.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 4 illustrates a data link protocol architecture layer 20 for a cdma2000 wireless network. The data link protocol architecture layer 20 includes an Upper Layer 60, a Link Layer 30 and a Physical layer 21.

The Upper layer 60 includes three sublayers; a Data Services sublayer 61; a Voice Services sublayer 62 and a Signaling Services sublayer 63. Data services 61 are services that deliver any form of data on behalf of a mobile end user and include packet data applications such as IP service, circuit data applications such as asynchronous fax and B-ISDN emulation services, and SMS. Voice services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

In the MS 2, the Signaling Services sublayer 63 is also responsible for maintaining call process states, specifically a MS 2 Initialization State, MS 2 Idle State, System Access State and MS 2 Control on Traffic Channel State.

The Link Layer 30 is subdivided into the Link Access Control (LAC) sublayer 32 and the Medium Access Control (MAC) sublayer 31. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 20.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The LAC sublayer 32 provides correct delivery of signaling messages. Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a best-effort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 20 is responsible for coding and modulation of data transmitted over the air. The Physical Layer 20 conditions digital data from the higher layers so that the data may be transmitted over a mobile radio channel reliably.

The Physical Layer 20 maps user data and signaling, which the MAC sublayer 31 delivers over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

FIG. 5 illustrates an overview of call processing. Processing a call includes pilot and sync channel processing, paging channel processing, Access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 Control on Traffic Channel State, with the dedicated forward and reverse traffic channels carrying user information, such as voice and data.

FIG. 6 illustrates the initialization state of a MS 2. The Initialization state includes a System Determination Substate, pilot channel processing, sync channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier. A custom selection process may control System determination. A service provider using a redirection process may also control System determination. After the MS 2 selects a system, it must determine on which channel within that system to search for service. Generally the MS 2 uses a prioritized channel list to select the channel.

Pilot channel processing is a process whereby the MS 2 first gains information regarding system timing by searching for usable pilot signals. Pilot channels contain no information, but the MS 2 can align its own timing by correlating with the pilot channel. Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

In the Idle State, the MS 2 receives one of the Paging channels and processes the messages on that channel. Overhead or configuration messages are compared to stored sequence numbers to ensure the MS 2 has the most current parameters. Messages to the MS 2 are checked to determine the intended subscriber.

The Multiplexing and QoS Control sublayer 34 has both a transmitting function and a receiving function. The transmitting function combines information from various sources, such as Data Services 61, Signaling Services 63 or Voice Services 62, and forms Physical layer SDUs and PDCHCF SDUs for transmission. The receiving function separates the information contained in Physical Layer 21 and PDCHCF SDUs and directs the information to the correct entity, such as Data Services 61, Upper Layer Signaling 63 or Voice Services 62.

The Multiplexing and QoS Control sublayer 34 operates in time synchronization with the Physical Layer 21. If the Physical Layer 21 is transmitting with a non-zero frame offset, the Multiplexing and QoS Control sublayer 34 delivers Physical Layer SDUs for transmission by the Physical Layer at the appropriate frame offset from system time.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the sync channel, forward common control channel, broadcast control channel, paging channel and access channel procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

A 1×EV-DO system is optimized for packet data service and characterized by a single 1.25 MHz carrier ("1×") for data only or data Optimized ("DO"). Furthermore, there is a peak data rate of 2.4 Mbps or 3.072 Mbps on the forward Link and 153.6 Kbps or 1.8432 Mbps on the reverse Link. Moreover, a 1×EV-DO system provides separated frequency bands and internetworking with a 1× System. FIG. 7 illustrates a comparison of cdma2000 for a 1× system and 1×EV-DO system.

In a cdma2000 system, there are concurrent services, whereby voice and data are transmitted together at a maximum data rate of 614.4 kbps and 307.2 kbps in practice. An MS 2 communicates with the MSC 5 for voice calls and with the PDSN 12 for data calls. A cdma2000 system is characterized by a fixed rate with variable power with a Walsh-code separated forward traffic channel.

In a 1×EV-DO system, the maximum data rate is 2.4 Mbps or 3.072 Mbps and there is no communication with the circuit-switched core network 7. A 1×EV-DO system is characterized by fixed power and a variable rate with a single forward channel that is time division multiplexed.

FIG. 8 illustrates a 1×EV-DO system architecture. In a 1×EV-DO system, a frame consists of 16 slots, with 600 slots/sec, and has a duration of 26.67 ms, or 32,768 chips. A single slot is 1.6667 ms long and has 2048 chips. A control/traffic channel has 1600 chips in a slot, a pilot channel has 192 chips in a slot and a MAC channel has 256 chips in a slot. A 1×EV-DO system facilitates simpler and faster channel estimation and time synchronization, FIG. 9 illustrates a 1×EV-DO system default protocol architecture. FIG. 10 illustrates a 1×EV-DO system non-default protocol architecture.

Information related to a session in a 1×EV-DO system includes a set of protocols used by an MS 2, or access terminal (AT), and a BS 6, or access network (AN), over an airlink, a Unicast Access Terminal Identifier (UATI), configuration of the protocols used by the AT and AN over the airlink and an estimate of the current AT location.

The Application Layer provides best effort, whereby the message is sent once, and reliable delivery, whereby the message can be retransmitted one or more times. The Steam Layer provides the ability to multiplex up to 4 (default) or 255 (non-default) application streams for one AT 2.

The Session Layer ensures the session is still valid and manages closing of session, specifies procedures for the initial UATI assignment, and maintains AT addresses and negotiates/provisions the protocols used during the session and the configuration parameters for these protocols.

FIG. 11 illustrates the establishment of a 1×EV-DO session. As illustrated in FIG. 11, establishing a session includes address configuration, Connection Establishment, Session configuration and Exchange Keys.

Address configuration refers to an Address Management protocol assigning a UATI and Subnet mask. Connection Establishment refers to Connection Layer protocols setting up a radio link. Session configuration refers to a Session Configuration Protocol configuring all protocols. Exchange Keys refers a Key Exchange protocol in the Security Layer setting up keys for authentication.

A "session" refers to the logical communication link between the AT 2 and the RNC, which remains open for hours, with a default of 54 hours. A session lasts until the PPP session is active as well. Session information is controlled and maintained by the RNC in the AN 6.

When a connection is opened, the AT 2 can be assigned the forward traffic channel and is assigned a reverse traffic channel and reverse power control channel. Multiple connections may occur during single session. There are two connection states in a 1×EV-DO system, a closed connection and an open connection.

A closed connection refers to a state where the AT 2 is not assigned any dedicated air-link resources and communications between the AT and AN 6 are conducted over the access channel and the control channel. An open connection refers to a state where the AT 2 can be assigned the forward traffic channel, is assigned a reverse power control channel and a reverse traffic channel and communication between the AT 2 and AN 6 is conducted over these assigned channels as well as over the control channel.

The Connection Layer manages initial acquisition of the network, setting an open connection and closed connection and communications. Furthermore, the Connection Layer maintains an approximate AT 2 location in both the open connection and closed connection and manages a radio link between the AT 2 and the AN 6 when there is an open connection. Moreover, the Connection Layer performs supervision in both the open connection and closed connection, prioritizes and encapsulates transmitted data received from the Session Layer, forwards the prioritized data to the Security Layer and decapsulates data received from the Security Layer and forwards it to the Session Layer.

FIG. 12 illustrates Connection Layer Protocols. As illustrated in FIG. 12, the protocols include an Initialization State, an Idle State and a Connected State.

The Initialization State Protocol performs actions associated with acquiring an AN 6. The Idle State Protocol performs actions associated with an AT 2 that has acquired an AN 6, but does not have an open connection, such as keeping track of the AT location using a Route Update Protocol. The Connected State Protocol performs actions associated with an AT 2 that has an open connection, such as managing the radio link between the AT and AN 6 and managing the procedures leading to a closed connection. The Route Update Protocol performs actions associated with keeping track of the AT 2 location and maintaining the radio link between the AT and AN 6. The Overhead message Protocol broadcasts essential parameters, such as QuickConfig, SectorParameters and AccessParameters message, over the control channel. The Packet Consolidation Protocol consolidates and prioritizes packets for transmission as a function of their assigned priority and the target channel as well as providing packet de-multiplexing on the receiver.

The Security Layer includes a key exchange function, authentication function and encryption function. The key exchange function provides the procedures followed by the AN 2 and AT 6 for authenticating traffic. The authentication function provides the procedures followed by the AN 2 and AT 6 to exchange security keys for authentication and encryption. The encryption function provides the procedures followed by the AN 2 and AT 6 for encrypting traffic.

The 1×EV-DO forward Link is characterized in that no power control and no soft handoff is supported. The AN 6 transmits at constant power and the AT 2 requests variable rates on the forward Link. Because different users may transmit at different times in TDM, it is difficult to implement diversity transmission from different BS's 6 that are intended for a single user.

In the MAC Layer, two types of messages originated from higher layers are transported across the physical layer, specifically a User data message and a signaling message. Two protocols are used to process the two types of messages, specifically a forward traffic channel MAC Protocol for the User data message and a control channel MAC Protocol, for the signaling message.

The Physical Layer is characterized by a spreading rate of 1.2288 Mcps, a frame consisting of 16 slots and 26.67 ms, with a slot of 1.67 ms and 2048 chips. The forward Link channel includes a pilot channel, a forward traffic channel or control channel and a MAC channel.

The pilot channel is similar to the to the cdma2000pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 3.072 Mbps. Physical Layer packets can be transmitted in 1 to 16 slots and the transmit slots use 4-slot interlacing when more than one slot is allocated. If ACK is received on the reverse Link ACK channel before all of the allocated slots have been transmitted, the remaining slots shall not be transmitted.

The control channel is similar to the sync channel and paging channel in CDMA2000. The control channel is characterized by a period of 256 slots or 427.52 ms, a Physical Layer packet length of 1024 bits or 128, 256, 512 and 1024 bits and a data rate of 38.4 kbps or 76.8 kbps or 19.2 kbps, 38.4 kbps or 76.8 kbps.

The AT 2 can distinguish forward traffic channel transmissions from control channel transmissions based on the Preamble. The Preamble is defined by MACIndex, with MACIndex assigned to the AT 2 by receiving a TrafficchannelAssignment message of the Route Update Protocol in the Connection Layer.

The MAC channel provides a reverse Activity (RA) channel, a reverse power control channel, a DRCLock channel, an ARQ channel and a pilot channel.

The reverse Activity (RA) channel is used by the AN 2 to inform all ATs within its coverage area of the current activity on the reverse Link and is a MAC channel with MAC Index 4. The RA channel carries reverse Activity Bits (RAB), with RAB transmitted over RABLength successive slots (Subtype 0, 1) with a bit rate of (600/RABLength) bps or 600 bps.

The AN 6 uses the reverse power control (RPC) channel for power control of the AT's 2 reverse link transmissions. A reverse power control Bit is transmitted through the RPC channel, with a data rate of 600(1-1/DRCLockPeriod) bps or 150 bps.

The ARQ channel supports reverse Link Hybrid-ARQ (H-ARQ), whereby remaining sub-packets are not transmitted if the AN 6 has resolved the Physical Layer packet. H-ARQ indicates whether the AN 6 successfully received the packet transmitted in slot m-8, m-7, m-6 and m-5.

ACK/NAK facilitates an AT 2 receiving some of the data and verifying the checksum. FIG. 13 illustrates ACK/NAK operation in the forward Link.

The 1×EV-DO reverse Link is characterized in that the AN 6 can power control the reverse Link by using reverse power control and more than one AN can receive the AT's 2 transmission via soft handoff. Furthermore, there is no TDM on the reverse Link, which is channelized by Walsh code using a long PN code.

Reverse traffic channels include a data channel, pilot channel, MAC channel and ACK channel. Primary and auxiliary pilot channels may be provided.

The AT 2 uses the ACK channel to inform the AN 6 whether a Physical Layer packet transmitted on the forward traffic channel has been received successfully. Specifically, the ACK bit is set to 0 indicates CRC OK and the ACK bit set to 1 indicates CRC Fail. FIG. 14 illustrates the use of the ACK channel in the reverse Link.

Conventional systems support only one Reverse Power Control and ARQ Channel in a single Forward Link carrier. Therefore, conventional systems are unable to accommodate integrated multi-carrier systems, specifically the multiplexing of multiple Reverse Power Control and ARQ Channels in multi-carrier wireless networks.

Therefore, there is a need for a method and apparatus that facilitates multiplexing of multiple Reverse Power Control and ARQ Channels in multi-carrier wireless networks. The present invention addresses this and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention is directed to integrated multi-carrier systems and, in particular, a method for multiplexing reverse link feedback channels for multiple reverse links in multi-carrier wireless networks. An object of the present invention is to enable assignment of a MAC Index for Reverse Link feedback channels to any Forward Link carrier in the Traffic Channel Assignment message in order to support a situation where a Forward Link carries feedback channels for more than one Reverse Links. Another object of the present invention is to facilitate setting up additional Reverse Link carriers. For example, a FL carrier of BW 1.25 MHz could carry two ACK Channels to support two separate 1.25 MHz RL carriers. For example, a FL carrier of BW 1.25 MHz could carry two Reverse Power Control Channels to support two separate 1.25 MHz RL carriers.

In one aspect of the invention, a method of assigning channels in a multi-carrier mobile communication system is provided. The method includes establishing at least one forward link carrier, establishing a plurality of reverse link feedback channels, each of the plurality of reverse link feedback channels corresponding to the at least one forward link carrier and transmitting a signaling message, the signaling message including at least one field indicating the assignment of the plurality of reverse link feedback channels to the at least one forward link carrier.

It is contemplated that the at least one field in the signaling message indicates a number of reverse link channels established. It is further contemplated that the at least one forward link carrier is a code division multiple access (CDMA) channel.

It is contemplated that each of the plurality of reverse link feedback channels includes a forward link control channel. It is further contemplated that the at least one field in the signaling message indicates a configuration of each of the established plurality of reverse link channels.

It is contemplated that the configuration of each of the established plurality of reverse link feedback channels includes information indicating the forward link carrier on which a reverse power control channel and a reverse link acknowledgment channel are transmitted. It is further contemplated that the configuration of each of the established plurality of reverse link feedback channels includes information indicating the forward link control carrier on which a data rate control lock channel is transmitted.

It is contemplated that the method includes establishing a first forward link carrier and a second forward link carrier, establishing the plurality of reverse link feedback channels such that each of the plurality of reverse link feedback channels corresponds to the first forward link carrier and the second forward link carrier and transmitting the signaling message including at least a first field indicating the assignment of the plurality of reverse link feedback channels to the first forward link carrier and at least a second field indicating the assignment of the plurality of reverse link feedback channels to the second forward link carrier. It is further contemplated that the at least first field and the at least second field in the signaling message indicate a number of reverse link channels established.

It is contemplated that the first forward link carrier and the second forward link carrier are code division multiple access (CDMA) channels. It is further contemplated that each of the plurality of reverse link feedback channels includes a forward link control channel.

It is contemplated that the at least first field and the at least second field in the signaling message indicate a configuration of each of the established plurality of reverse link channels. It is further contemplated that the configuration of each of the established plurality of reverse link feedback channels includes information indicating the forward link carrier on which a reverse power control channel and a reverse link acknowledgment channel are transmitted.

It is contemplated that the configuration of each of the established plurality of reverse link feedback channels includes information indicating the forward link control carrier on which a data rate control lock channel is transmitted. It is further contemplated that the first forward link carrier and the second forward link carrier use different frequencies.

In another aspect of the invention, a method of assigning channels in a multi-carrier mobile communication system is provided. The method includes establishing at least one forward link channel and establishing a plurality of reverse link feedback channels, each of the plurality of reverse channels corresponding to the at least one forward link channel.

It is contemplated that the method includes transmitting a signaling message, the signaling message including at least one field indicating the assignment of the plurality of reverse link feedback channels to the at least one forward link channel. It is further contemplated that the at least one field in the signaling message indicates a number of reverse link feedback channels established.

It is contemplated that the at least one field in the signaling message indicates whether assigning multiple reverse link feedback channels to a forward channel is supported. It is further contemplated that the at least one field in the signaling message indicates a configuration of each of the established plurality of reverse link feedback channels. Preferably, the configuration of each of the established plurality of reverse link channels includes information indicating the reverse link channel on which data rate control messages, messages and acknowledgment messages are transmitted.

In another aspect of the invention, a method of assigning channels in a multi-carrier mobile communication system is provided. The method includes establishing a plurality of forward link carriers, the plurality of forward link carriers using at least two different frequencies, establishing at least one reverse link feedback channel, the at least one reverse link feedback channel corresponding to the plurality of forward link carriers and transmitting a signaling message, the signaling message including at least one field indicating the assignment of the at least one reverse link feedback channel to the plurality of forward link carriers.

In another aspect of the invention, a method of assigning channels in a multi-carrier mobile communication system is provided. The method includes establishing a plurality of forward link carriers, the plurality of forward link carriers using at least two different frequencies, establishing a plurality of reverse link feedback channels, and establishing a correspondence between the plurality of forward link carriers and the plurality of reverse link feedback channels such that there is not a one-to-one correspondence between the plurality of forward link carriers and the plurality of reverse link feedback channels.

In another aspect of the invention, a mobile terminal is provided. The mobile terminal includes a transmitting/receiving unit adapted to receive at least one forward link carrier from a network and transmit a plurality of reverse link feedback channels and a signaling message to the network, a display unit adapted to display user interface information, an input unit adapted to input user data and a processing unit adapted to establish at least one forward link carrier and a plurality of reverse link feedback channels, each of the plurality of reverse link feedback channels corresponding to the at least one forward link carrier, and to transmit a signaling message, the signaling message including at least one field indicating the assignment of the plurality of reverse link feedback channels to the at least one forward link carrier.

It is contemplated that the at least one field in the signaling message indicates a number of reverse link channels established. It is further contemplated that the at least one forward link carrier is a code division multiple access (CDMA) channel.

It is contemplated that each of the plurality of reverse link feedback channels includes a forward link control channel. It is further contemplated that the at least one field in the signaling message indicates a configuration of each of the established plurality of reverse link channels.

It is contemplated that the configuration of each of the established plurality of reverse link feedback channels includes information indicating the forward link carrier on which a reverse power control channel and a reverse link acknowledgment channel are transmitted. It is further contemplated that the configuration of each of the established plurality of reverse link feedback channels includes information indicating the forward link control carrier on which a data rate control lock channel is transmitted.

It is contemplated that the configuration of each of the established plurality of reverse link channels includes information indicating the reverse link channel on which data rate control messages, messages and acknowledgment messages are transmitted. It is further contemplated that the processing unit is further adapted to establish a first forward link carrier and a second forward link carrier, establish the plurality of reverse link feedback channels such that each of the plurality of reverse link feedback channels corresponds to the first forward link carrier and the second forward link carrier and transmit the signaling message including at least a first field indicating the assignment of the plurality of reverse link feedback channels to the first forward link carrier and at least a second field indicating the assignment of the plurality of reverse link feedback channels to the second forward link carrier.

It is contemplated that the at least first field and the at least second field in the signaling message indicate a number of reverse link channels established. It is further contemplated that the first forward link carrier and the second forward link carrier are code division multiple access (CDMA) channels.

It is contemplated that each of the plurality of reverse link feedback channels includes a forward link control channel. It is further contemplated that the at least first field and the at least second field in the signaling message indicate a configuration of each of the established plurality of reverse link channels.

It is contemplated that the configuration of each of the established plurality of reverse link feedback channels includes information indicating the forward link carrier on which a reverse power control channel and a reverse link acknowledgment channel are transmitted. It is further contemplated that the configuration of each of the established plurality of reverse link feedback channels includes information indicating the forward link control carrier on which a data rate control lock channel is transmitted.

It is contemplated that the processing unit is further adapted to establish the first forward link carrier and the second forward link carrier using different frequencies. It is further contemplated that the at least one field in the signaling message indicates whether assigning multiple reverse link feedback channels to a forward channel is supported.

It is contemplated that the processing unit is further adapted to establish a plurality of forward link carriers, the plurality of forward link carriers using at least two different frequencies, establish at least one reverse link feedback channel, the at least one reverse link feedback channel corresponding to the plurality of forward link carriers and transmit the signaling message including at least one field indicating the assignment of the at least one reverse link feedback channel to the plurality of forward link carriers. It is further contemplated that the processing unit is further adapted to establish a plurality of forward link carriers, the plurality of forward link carriers using at least two different frequencies, establish a plurality of reverse link feedback channels, and establish a correspondence between the plurality of forward link carriers and the plurality of reverse link feedback channels such that there is not a one-to-one correspondence between the plurality of forward link carriers and the plurality of reverse link feedback channels.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 7 illustrates a comparison of cdma2000 for 1× and 1×EV-DO.

FIGS. 15A-D illustrate a TCA message according to one embodiment of the present invention.

DETAILED DESCRIPTION OF THE PREFERRED EMBODIMENTS

Figure 1:
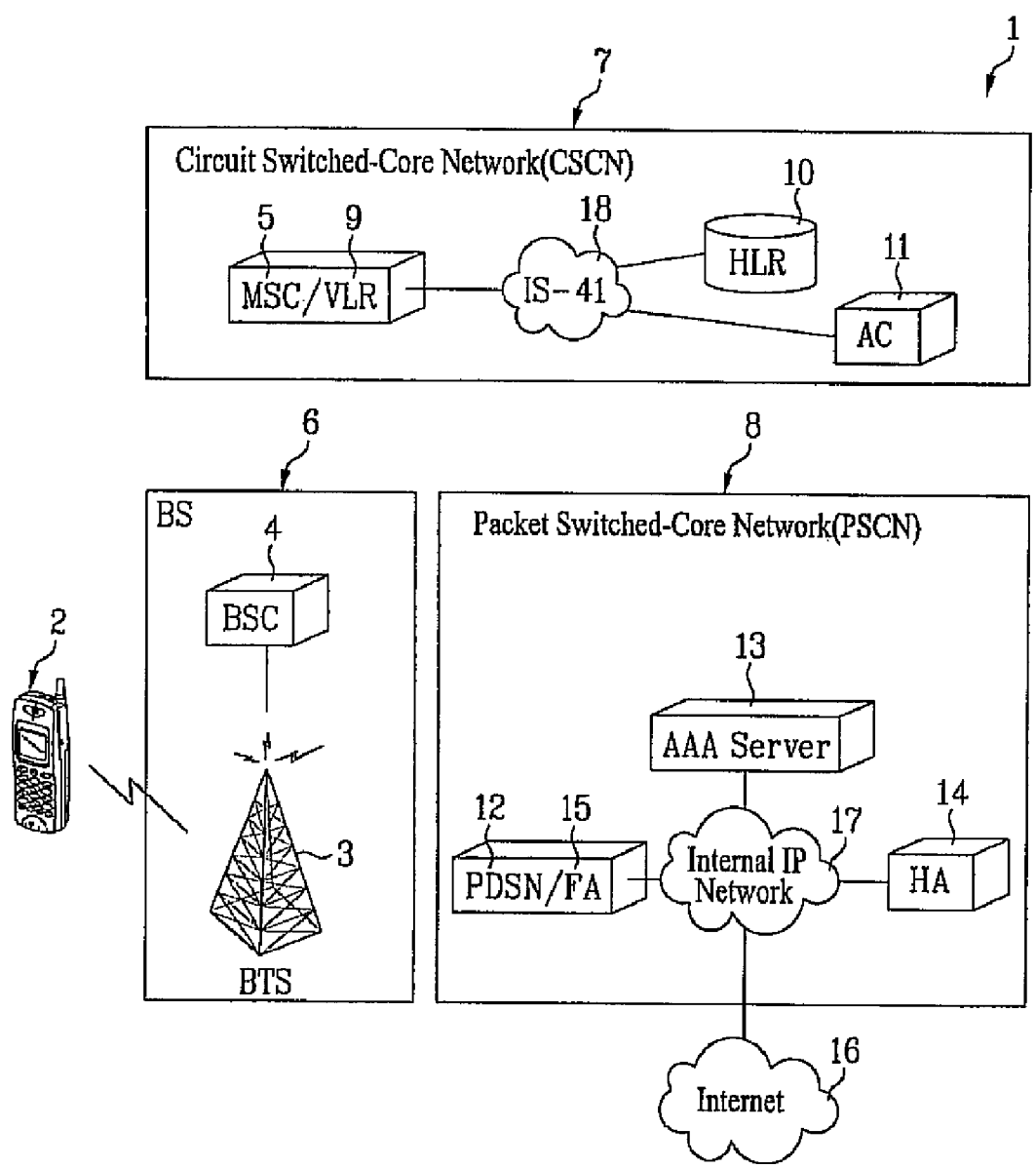
FIG. 1 illustrates wireless communication network architecture.
Figure 2A:
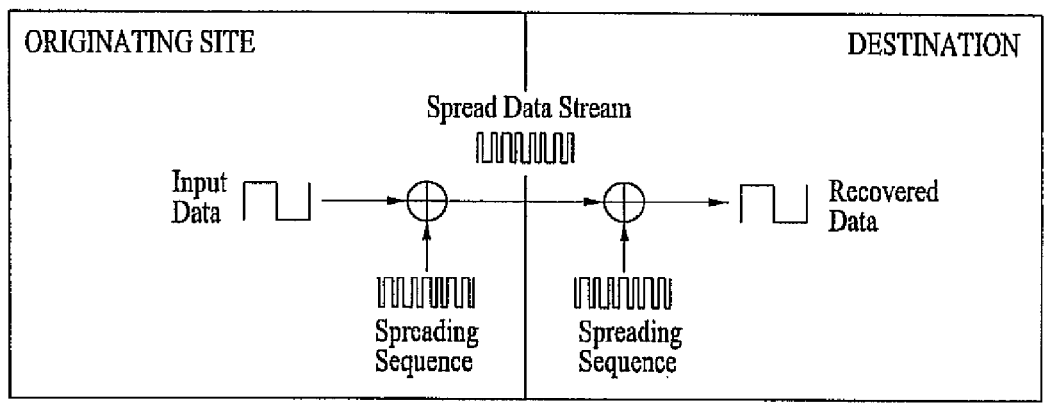
FIG. 2A illustrates a CDMA spreading and de-spreading process.
Figure 2B:
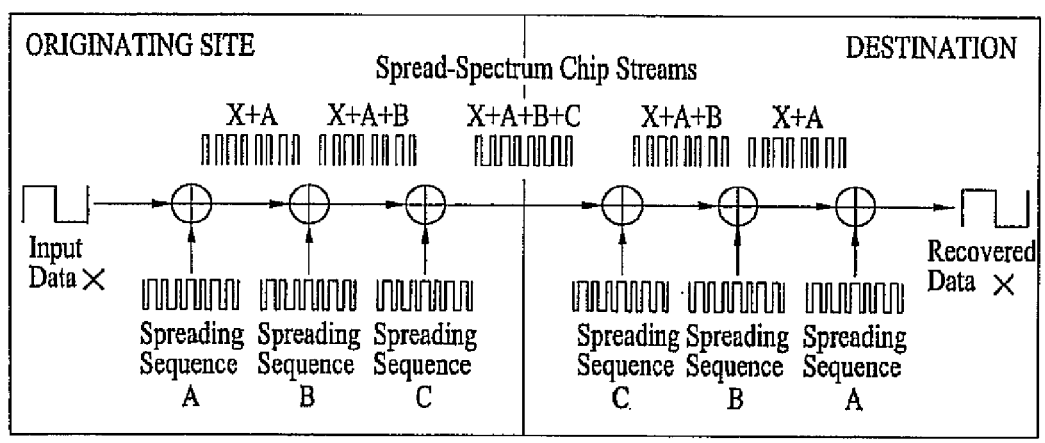
FIG. 2B illustrates a CDMA spreading and de-spreading process using multiple spreading sequences.
Figure 3:
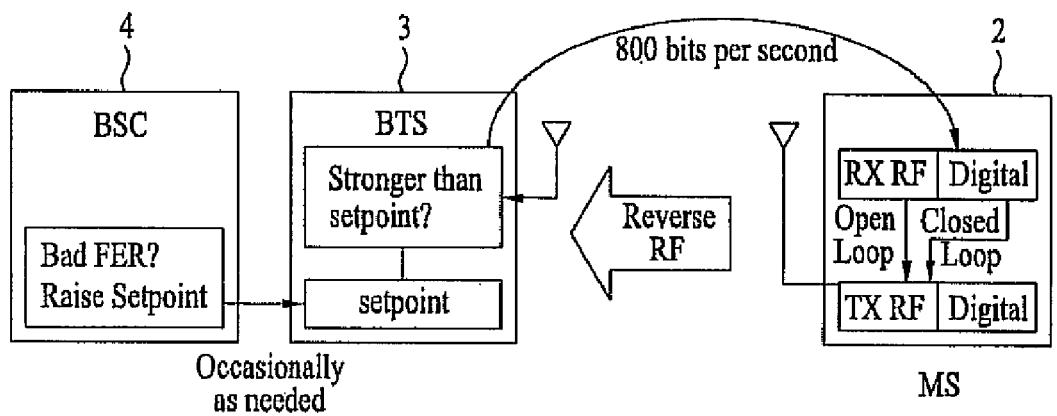
FIG. 3 illustrates CDMA reverse power control methods.
Figure 4:
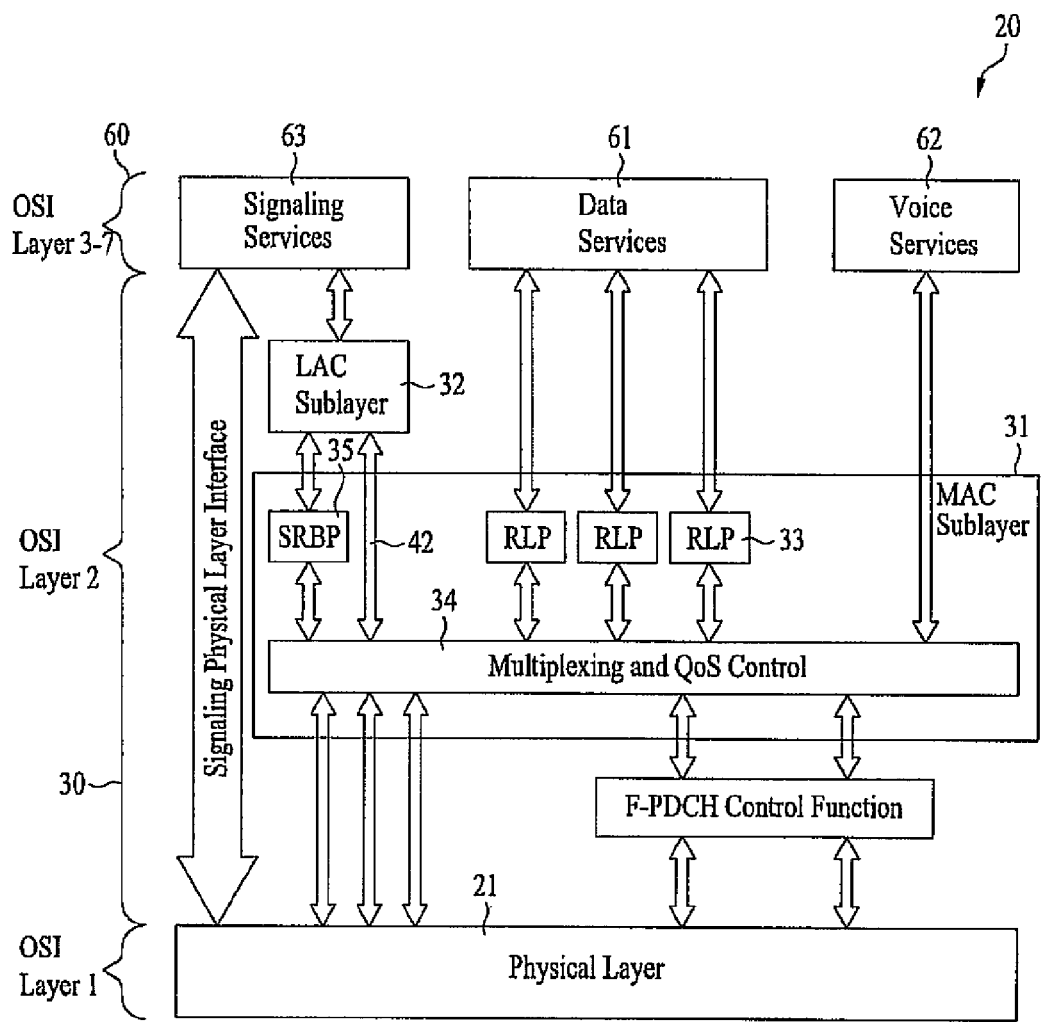
FIG. 4 illustrates a data link protocol architecture layer for a cdma2000 wireless network.
Figure 5:
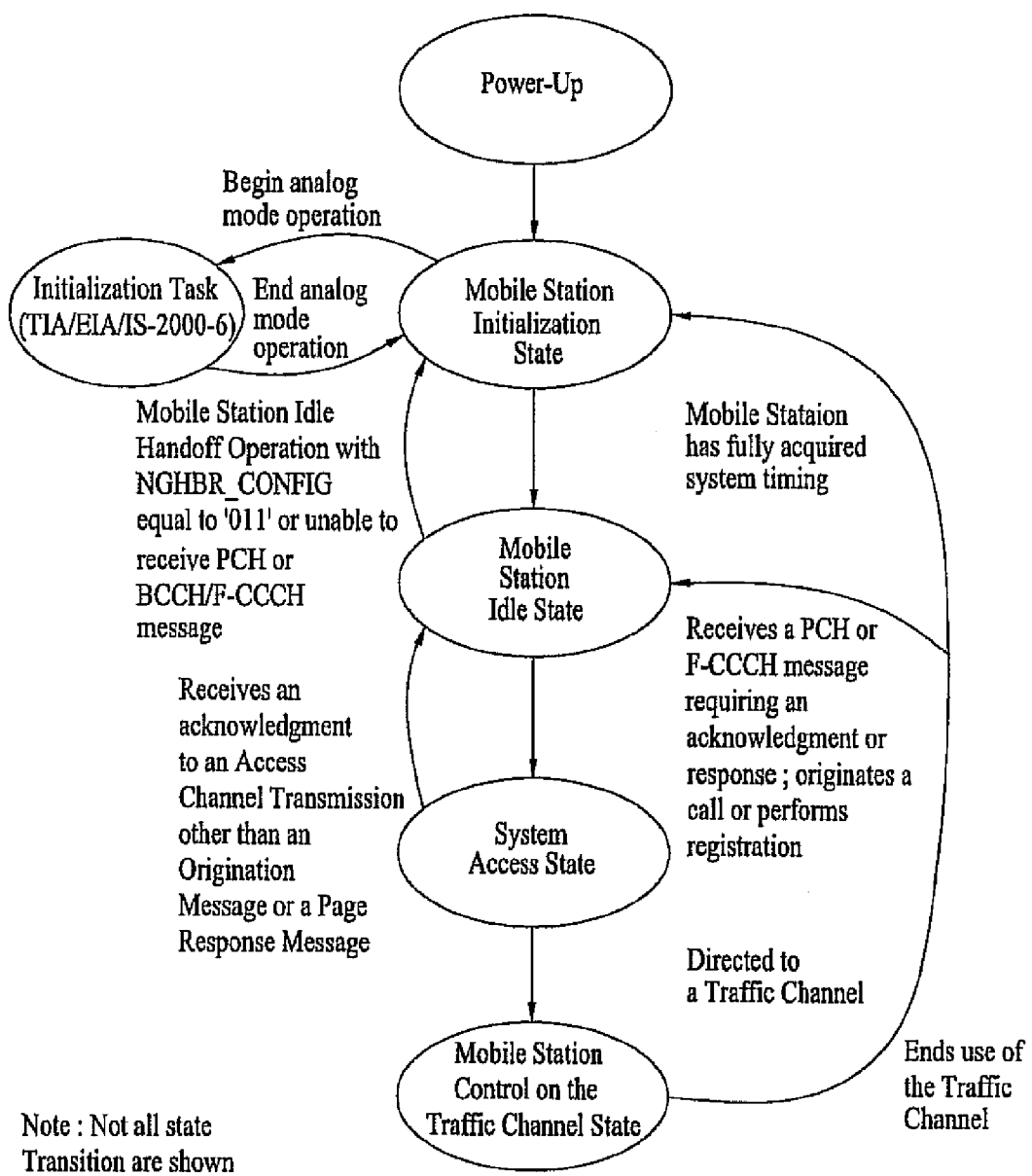
FIG. 5 illustrates cdma2000 call processing.
Figure 6:
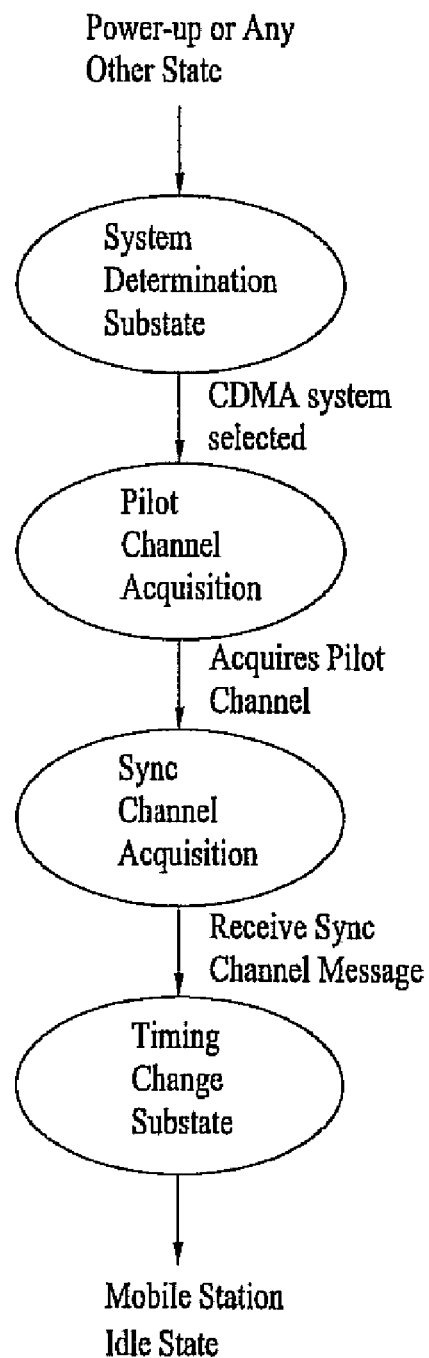
FIG. 6 illustrates the cdma2000 initialization state.
Figure 8:
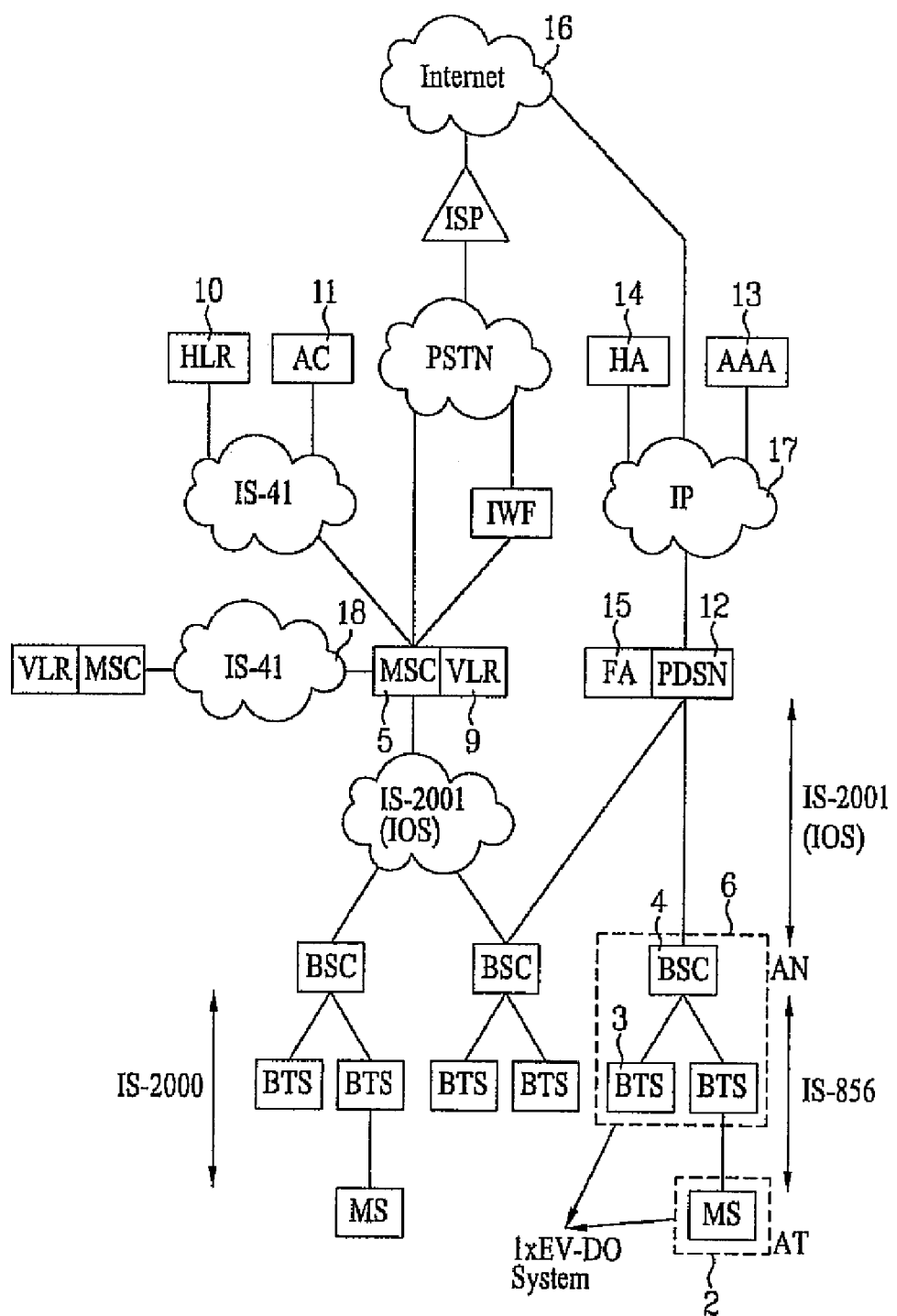
FIG. 8 illustrates a network architecture layer for a 1×EV-DO wireless network.
Figure 9:
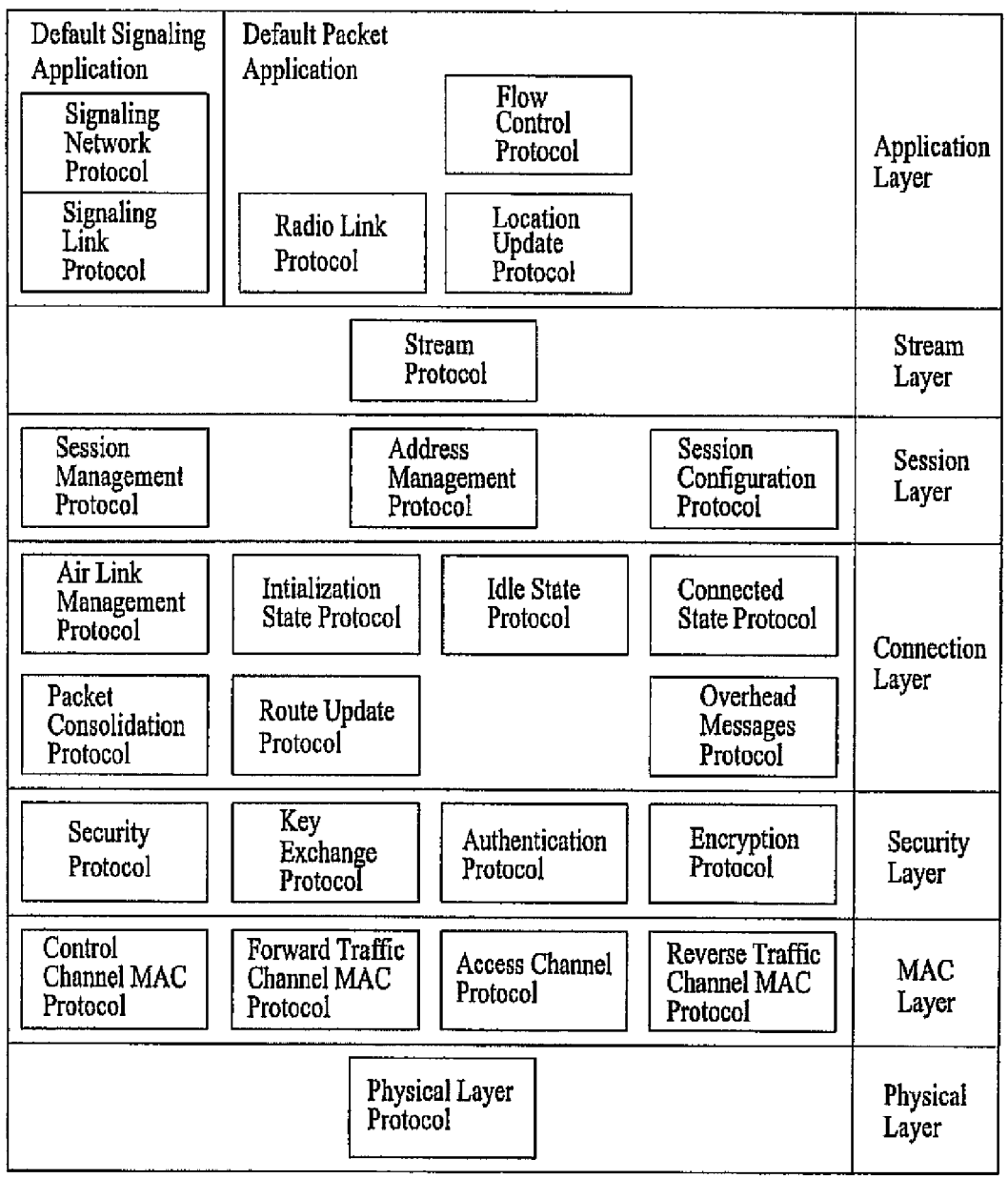
FIG. 9 illustrates 1×EV-DO default protocol architecture.
Figure 10:
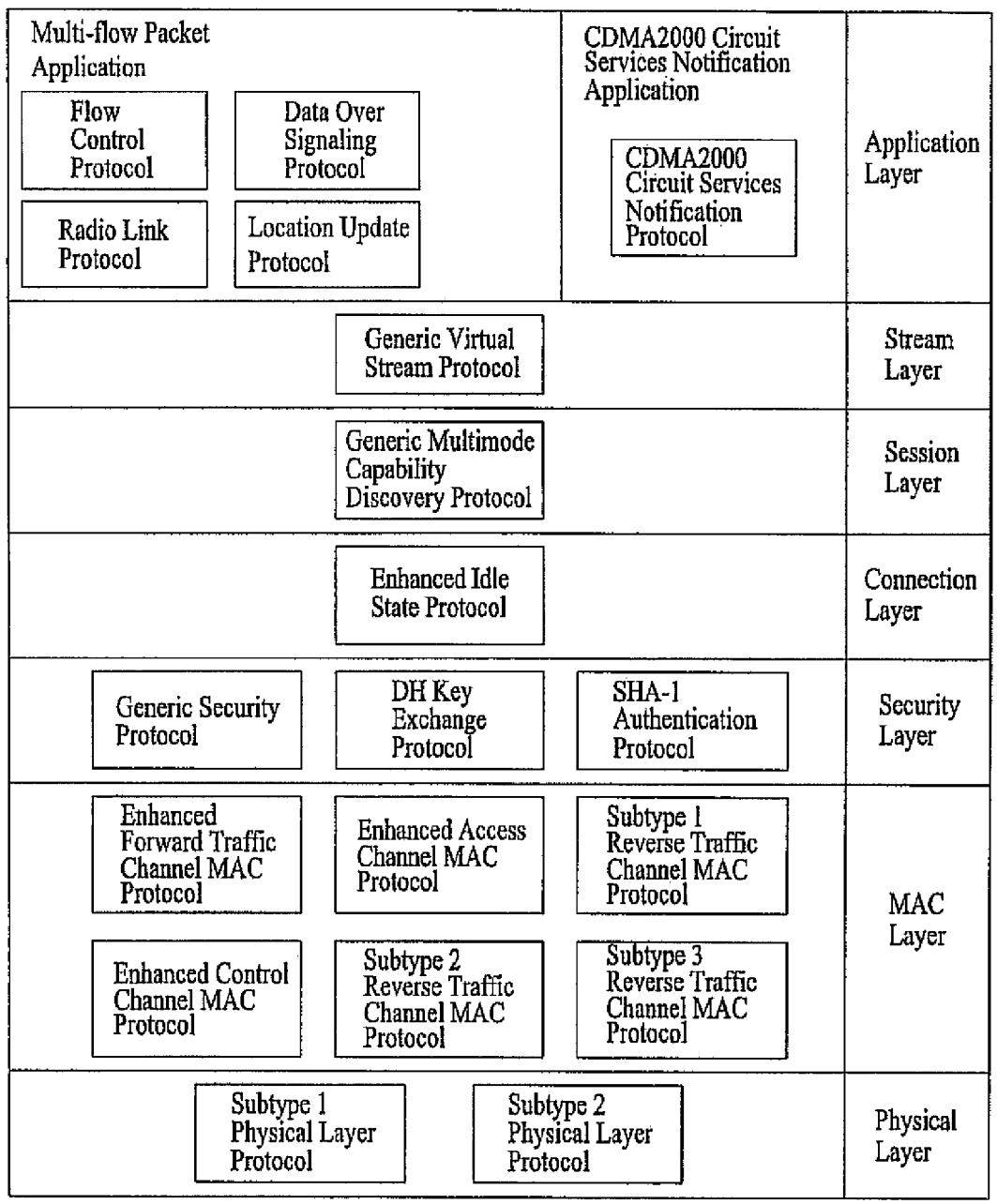
FIG. 10 illustrates 1×EV-DO non-default protocol architecture.
Figure 11:
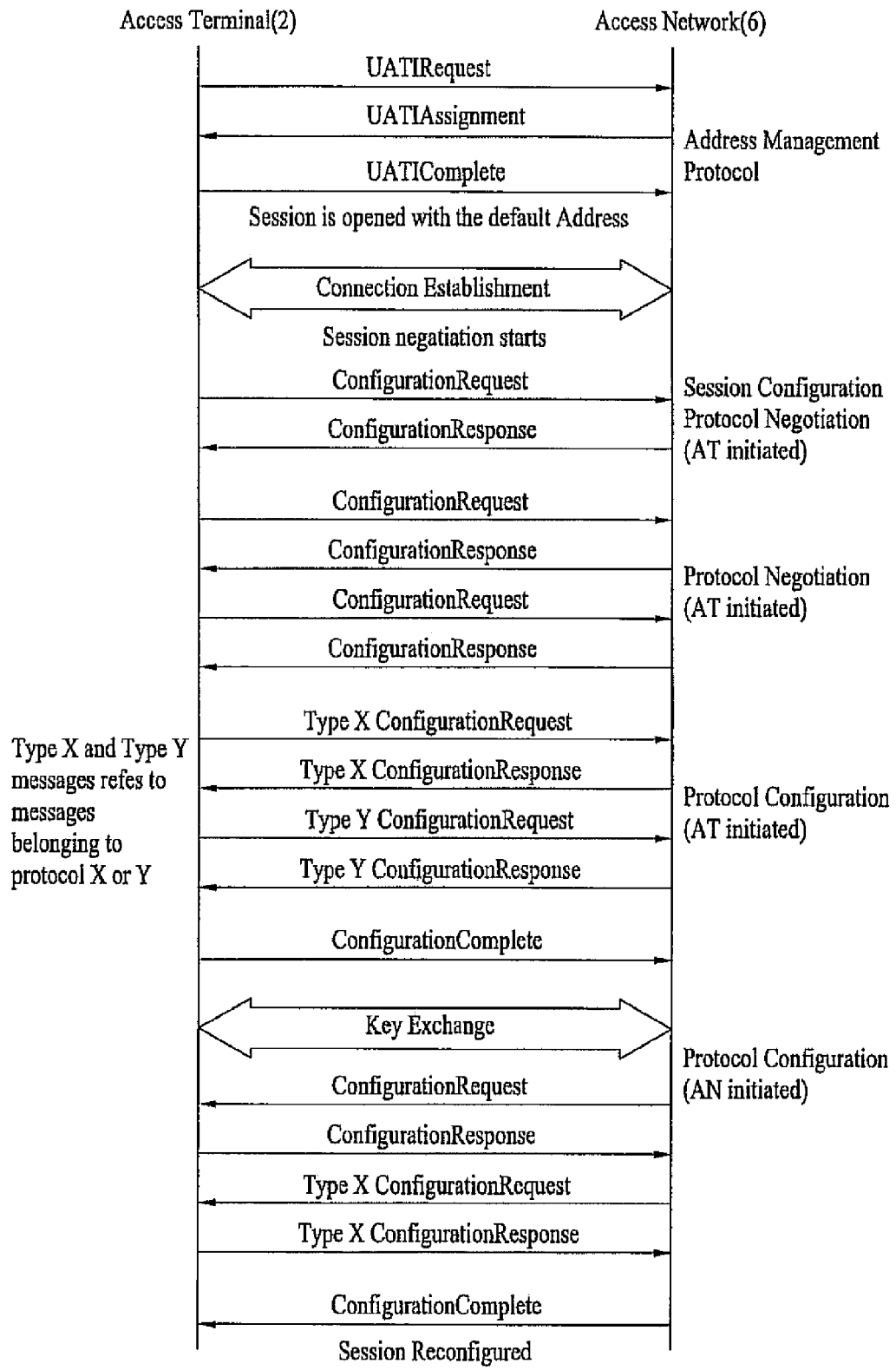
FIG. 11 illustrates 1×EV-DO session establishment.
Figure 12:
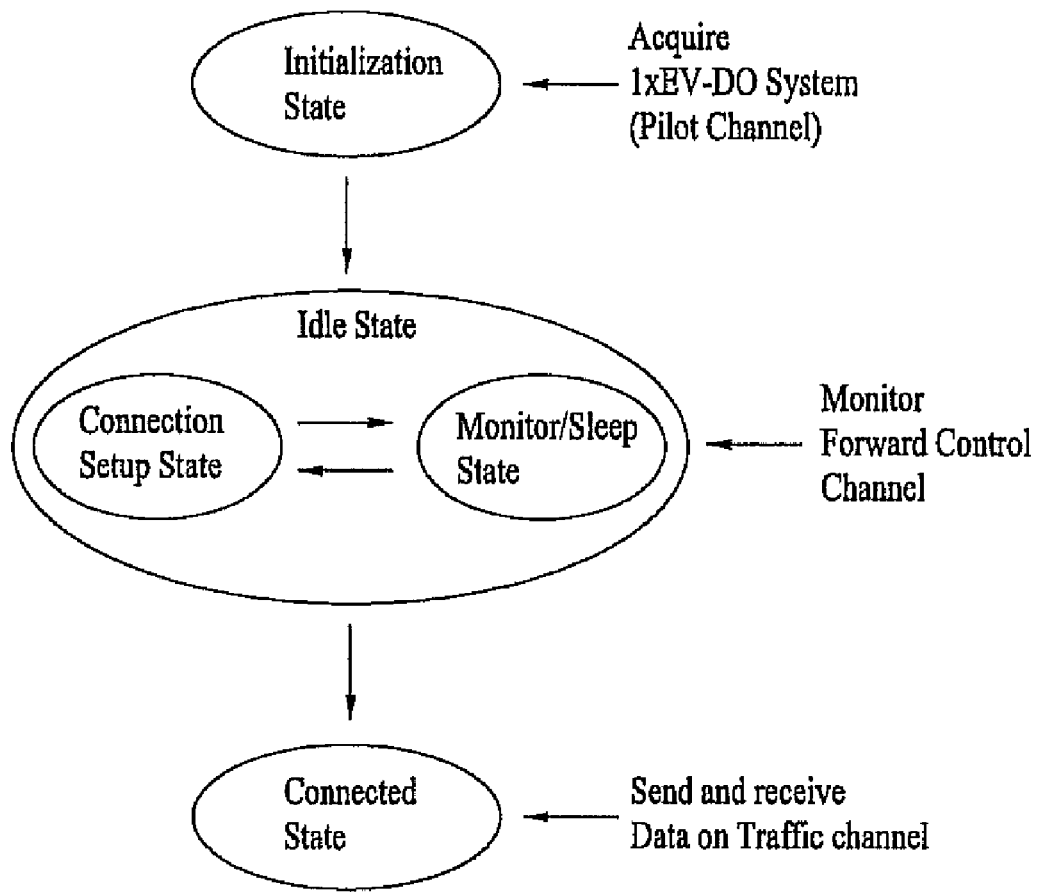
FIG. 12 illustrates 1×EV-DO connection layer protocols.
Figure 13:
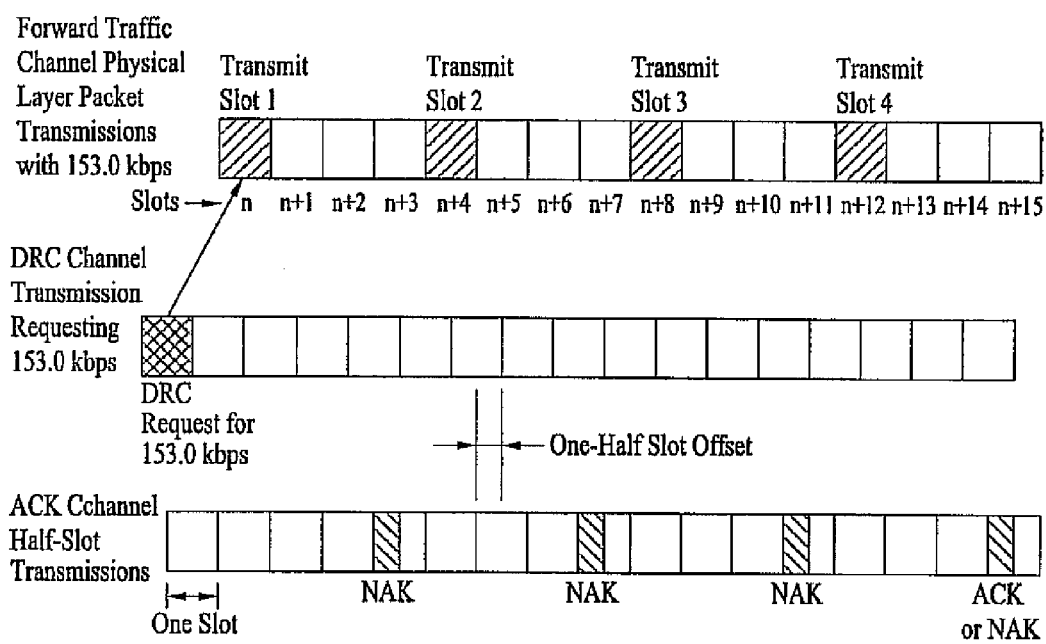
FIG. 13 illustrates 1×EV-DO ACK/NAK operation.
Figure 14:
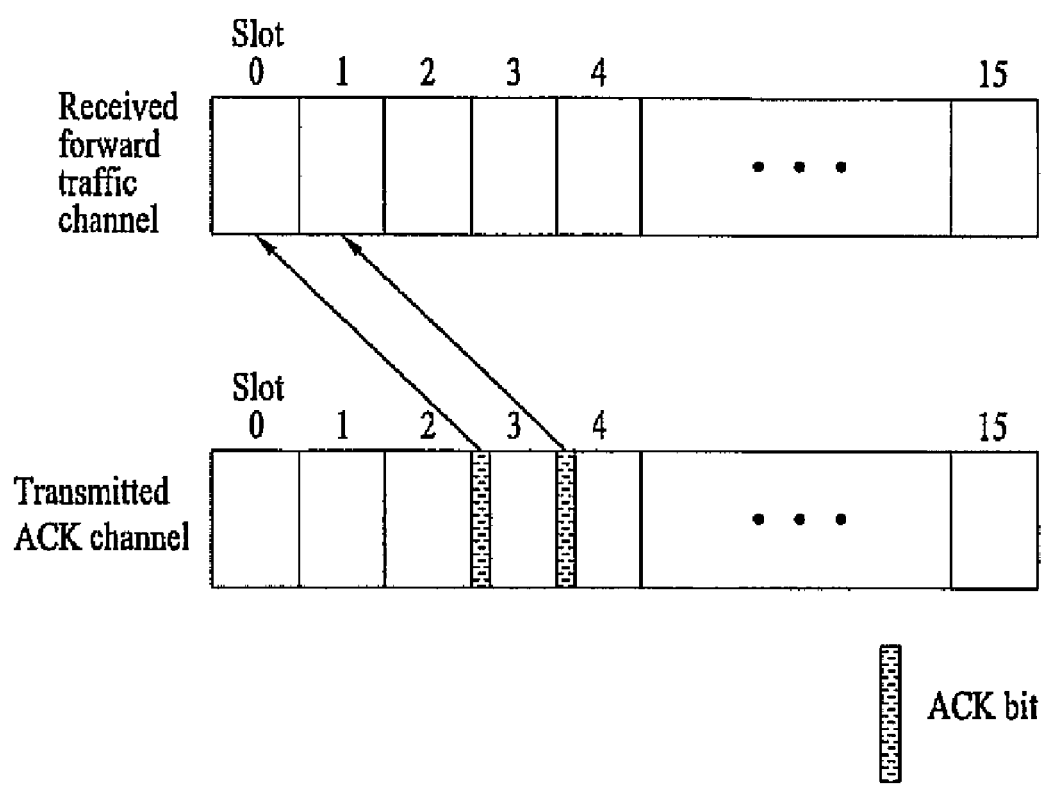
FIG. 14 illustrates the 1×EV-DO reverse link ACK channel.

The present invention is directed to integrated multi-carrier systems in which multiple reverse link feedback channels on the forward link such as Reverse Power Control (RPC), Data Rate Control Lock (DRCLock) and ARQ Channels are multiplexed in multi-carrier wireless networks. The Reverse Power Control Channels carry power control commands over the forward link to control the transmit power of mobile terminals. The DRCLock channel feedbacks to the transmitter that the receiver has "locked" on to the transmitted DRC channel. The ARQ channels feedback an Acknowledgement (ACK) or Negative ACK (NACK) indicating whether the receiver has successfully decoded a received packet. The methods and apparatus of the present invention facilitate assignment of a MAC Index for reverse link feedback channels to any forward link carrier using the Traffic Channel Assignment (TCA) message.

In conventional systems, only one MAC Index is assigned per Forward Link carrier. Therefore, conventional systems do not allow assignment of multiple RPC and ARQ MAC Indices in one Forward Link carrier. By changing the TCA message to support multiple RPC MAC Indices per Forward Link carrier, the Forward Link may carry multiple feedback channels for the Reverse Link and facilitate setting up additional Reverse Link carriers.

The methods and apparatus of the present invention address the situation where the number of Reverse Link carriers is greater than the number of Forward Link carriers. Therefore, applications in which Reverse Link traffic significantly exceeds Forward Link traffic, such as when uploading, may be supported.

Note that the present invention is directed to multiplexing RPC and ARQ channels on a single Forward Link carrier and does not assume that the number of Reverse Link (RL) carriers is greater than the number of Forward Link carriers. Therefore, the MAC Index for RL feedback channels may be assigned to any Forward Link carrier in the TCA message in order to support the situation where a Forward Link carries more than one feedback channel for Reverse Link.

According to the methods of the present invention, the AN 6 sends a TCA message to manage the Active Set of an AT 2. FIGS. 15A-D illustrate a TCA message according to one embodiment of the present invention.

Figure 15D:
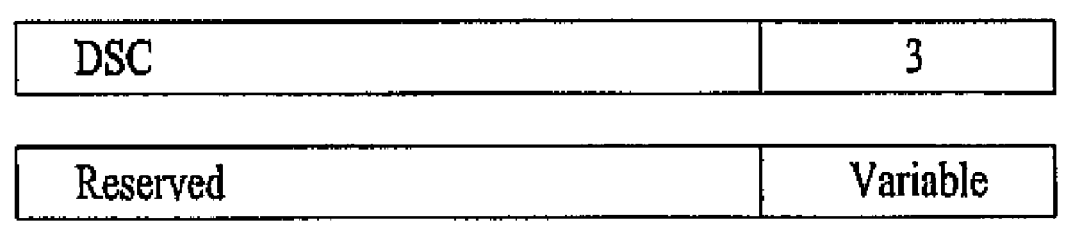

The TCA message includes all the fields indicated in FIG. 15A. The TCA message further includes the SectorInformation record illustrated in FIG. 15B, which is repeated according to the NumSectors field such that there are "NumSectors" occurrences of the SectorInformation record. Furthermore, the TCA message includes the SubActiveSetParameters record illustrated in FIG. 15C, which is repeated according to the NumSubActiveSets field such that there are "NumSubActiveSets" occurrences of the SubActiveSetParameters record. Moreover, each TCA message includes "N" occurrences of the DSC field, where "N" is the number of SofterHandoff fields set to "0" in the "NumSectors" occurrences of the SectorInformation record, and the Reserved field as illustrated in FIG. 15D.

The SubActiveSetParameters record includes all fields from NumFwdChannelsThisSubActiveSet through RABMACIndex as illustrated In FIG. 15C. Some of the fields of the SubActiveSetParameters record are repeated according to the values of other fields in the TCA message.

Within each of the NumSubActiveSets occurrences of the SubActiveSetParameters record, there is a record x consists of ReverseChannelConfiguration, ReverseBandClass, ReverseChannelNumber, ReverseChannelDroppingRank. This record x indicates that the reverse channels whose Reverse Power Control Channels, Data Rate Control Lock Channels and Reverse Link Acknowledgement Channels are carried by the forward link SubActive set associated with the occurrence of the SubActiveSetParameters record (Usually one SubActiveSet corresponds to one forward link carrier).

Figure 16:
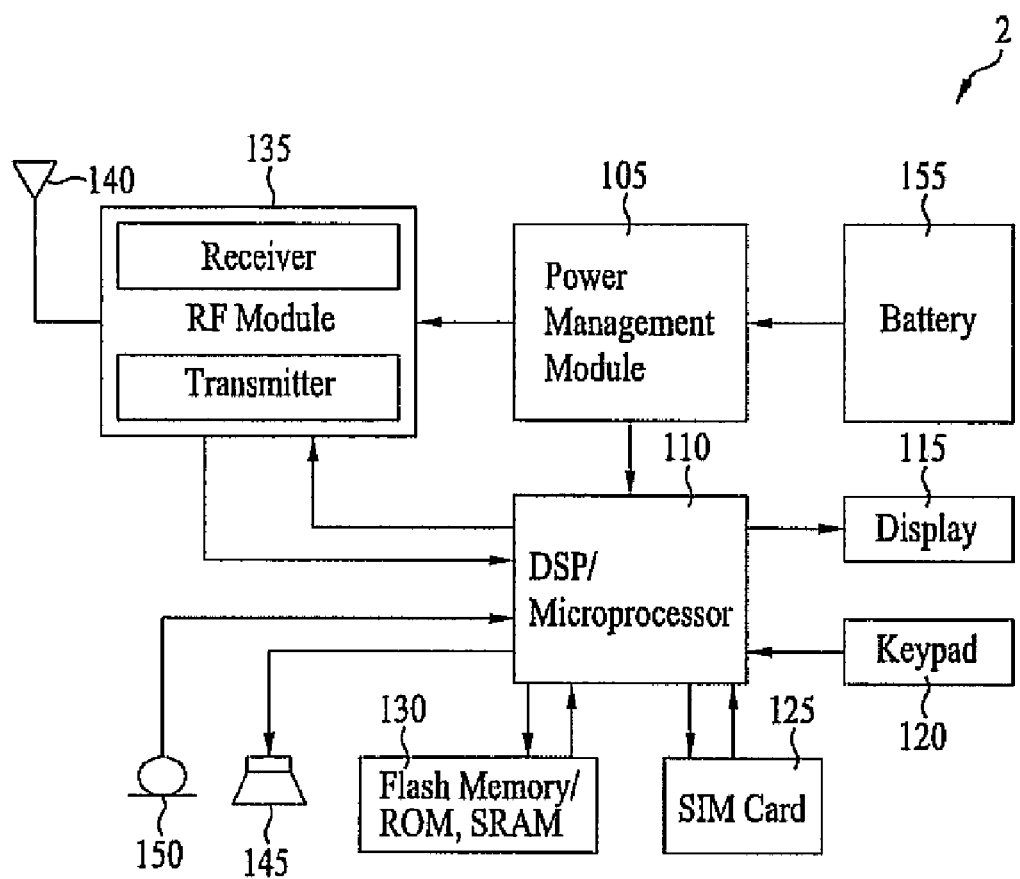
FIG. 16 illustrates a block diagram of a mobile station or access terminal.

FIG. 16 illustrates a block diagram of a mobile station (MS) or Access Terminal 2. The AT 2 includes a processor (or digital signal processor) 110, RF module 135, power management module 105, antenna 140, battery 155, display 115, keypad 120, memory 130, SIM card 125 (which may be optional), speaker 145 and microphone 150.

A user enters instructional information, such as a telephone number, for example, by pushing the buttons of a keypad 120 or by voice activation using the microphone 150. The microprocessor 110 receives and processes the instructional information to perform the appropriate function, such as to dial the telephone number. Operational data may be retrieved from the Subscriber Identity Module (SIM) card 125 or the memory module 130 to perform the function. Furthermore, the processor 110 may display the instructional and operational information on the display 115 for the user's reference and convenience.

The processor 110 issues instructional information to the RF module 135, to initiate communication, for example, transmit radio signals comprising voice communication data. The RF module 135 comprises a receiver and a transmitter to receive and transmit radio signals. An antenna 140 facilitates the transmission and reception of radio signals. Upon receiving radio signals, the RF module 135 may forward and convert the signals to baseband frequency for processing by the processor 110. The processed signals would be transformed into audible or readable information outputted via the speaker 145, for example.

The processor 110 also includes the protocols and functions necessary to perform the various processes described herein with regard to cdma2000 or 1×EV-DO systems. The processor 110 is further adapted to perform the methods disclosed herein for assigning a MAC Index for reverse link feedback channel to any forward link carrier using the TCA message.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of assigning channels in a multi-carrier mobile communication system, the method comprising:
   establishing a forward link carrier;
   establishing a plurality of reverse power control (RPC) channels, each of the plurality of RPC channels corresponding to the forward link carrier; and
   transmitting a traffic channel assignment (TCA) message, the TCA message comprising at least one field indicating the assignment of the plurality of RPC channels to the same forward link carrier and indicating multiple RPC medium access control (MAC) indices assigned per forward link carrier.

2. The method of claim 1, wherein the at least one field in the TCA message further indicates a number of RPC channels established.

3. The method of claim 1, wherein the forward link carrier is a code division multiple access (CDMA) channel.

4. The method of claim 1, wherein the at least one field in the TCA message further indicates a configuration of each of the established plurality of RPC channels.

5. The method of claim 1, wherein the at least one field in the TCA message further indicates whether assigning multiple RPC channels to a forward channel is supported.

6. A mobile terminal, comprising:
- a transmitting/receiving unit for receiving at least one forward link carrier and a plurality of reverse power control (RPC) channels from a network;
- a display unit for displaying user interface information;
- an input unit for receiving user data; and
- a processing unit for establishing a forward link carrier and the plurality of RPC channels, each of the plurality of RPC channels corresponding to the forward link carrier, and for receiving a traffic channel assignment (TCA) message, the TCA message comprising at least one field indicating the assignment of the plurality of RPC channels to the same forward link carrier and indicating multiple RPC medium access control (MAC) indices assigned per forward link carrier.

7. The terminal of claim 6, wherein the at least one field in the TCA message further indicates a number of RPC channels established.

8. The terminal of claim 6, wherein the forward link carrier is a code division multiple access (CDMA) channel.

9. The terminal of claim 6, wherein the at least one field in the TCA message further indicates a configuration of each of the established plurality of RPC channels.

* * * * *